Figure 1:
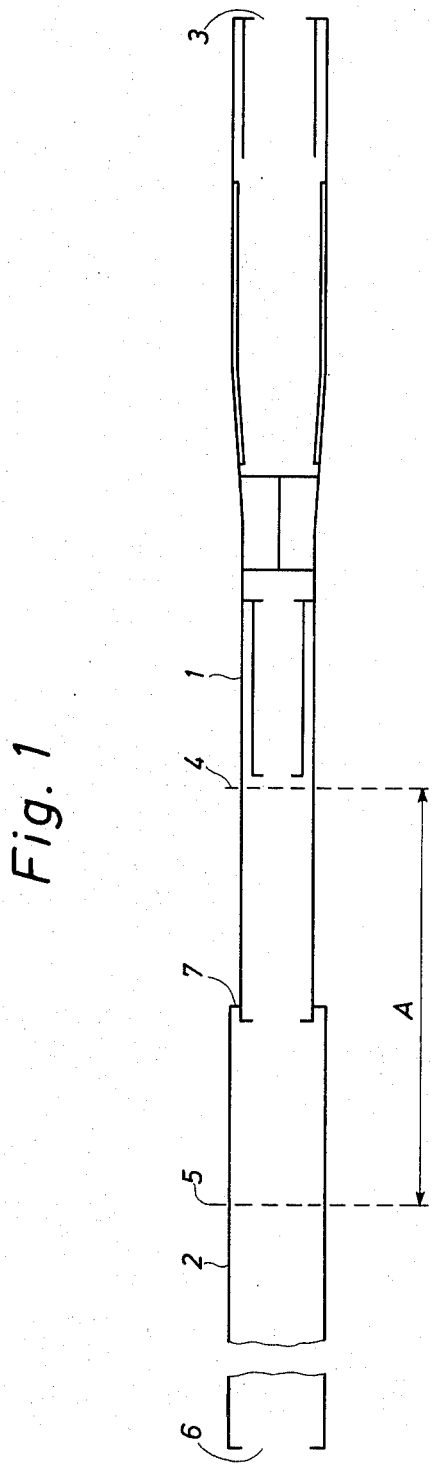

United States Patent
Kamstrup-Larsen

[15] 3,690,628
[45] Sept. 12, 1972

[54] METHOD AND A ROTARY KILN FOR PRODUCING A BLOATED CLAY PRODUCT

[72] Inventor: Harry Kamstrup-Larsen, Copenhagen Valby, Denmark

[73] Assignee: A/S Dansk Lecabeton, Glostrup, Denmark

[22] Filed: Aug. 6, 1970

[21] Appl. No.: 61,781

[30] Foreign Application Priority Data

Aug. 6, 1969 Denmark....................4228/69

[52] U.S. Cl..............263/21 B, 252/378 R, 263/32 R
[51] Int. Cl.................................................F27b 7/02
[58] Field of Search................263/21 B, 32 R, 33 R; 252/378 R, 378 P

[56] References Cited

UNITED STATES PATENTS 2,602,782  7/1952  Zoradi......................263/21 B
3,245,154  4/1966  Bojner et al. .............263/33 X
3,408,969  11/1968  Maurice...................263/33 R Primary Examiner—John J. Camby
Attorney—Cushman, Darby & Cushman

[57] ABSTRACT

A bloated granular clay product is manufactured by heating clay in a first step from atmospheric temperature to 300°–600° C. during a long period of time whereafter the clay now forming granules in a second step is heated to 1,150°–1,175° C. in a relatively short period of time i.e., about 15 – 30 minutes. The heating is effected in a rotary kiln having a drying section and a burning section. The first heating step is provided in the drying section and the second heating step takes place in a transition zone between the two sections. To ensure the quick heating in said second step there is provided heat transfer means in the transition zone.

14 Claims, 8 Drawing Figures

METHOD AND A ROTARY KILN FOR PRODUCING A BLOATED CLAY PRODUCT

The present invention relates to a method of producing a bloated clay product on basis of clay or clay slate while the clay is passing through a drying zone and a burning zone.

By the production of bloated granular clay products suitable as insulating building materials the clay is first dried in a drying zone in a rotary kiln whereafter it is bloated in a burning zone the temperature of which is higher than the temperature of the drying zone. Up till now the drying process has been effected by heating the singular clay granules smoothly from approximately 20° to 1,100° C. while conducting a flue gas through the kiln in counterflow of the granules. It has appeared, however, that the granules during such heating procedure will not always have fully exploited their ability of bloating. This gives rise to cracks in the middle of the granules. To this must be added that the bulk density of the final products will not be sufficiently low.

The object of the invention is to indicate a method of the above mentioned kind which makes possible that the ability of clay to bloat is fully exploited.

This object is obtained by the method according to the invention said method being characterized in that the temperature of the clay product in the drying zone is raised during a relatively long period of time from the ambient air temperature to 300°–600° C. whereafter the clay temperature during a relatively short period of time preferably 15 – 30 min. is raised to a temperature of 1,150°–1175° C. so as to ensure the full exploition of the ability of the clay to bloat, the second heating step being effected while the clay is in a transition zone between the drying zone and the burning zone. The ready-burnt granules will show a fine bloating which is evenly distributed over the whole cross section and the ability of the granules to bloat will be fully exploited. Because of the low bulk density of the product it is possible that the kilns in which drying and burning is effected may perform a larger capacity (the number of m³ final clay products produced per 24 hours) compared with previously. This involves improved economy of the process.

According to the invention the heating of the clay products from a temperature in the interval 300–600° C. to a temperature in the interval 1,150°–1,175° C. is made during 20 – 30 minutes. Hereby is obtained particularly good conditions for completely bloating of the granules of the clay product.

The invention relates also to a rotary kiln for working the method according to the invention. This kiln comprises a slowly rotating drying kiln and a quickly rotating burning kiln. The rotary kiln is characterized in having one or several heat transfer bodies having a great heat capacity, a great thermal conductivity and a large surface, said bodies being arranged close to the kiln lining without touching the same, said bodies further being arranged in a transition zone between the drying kiln and the burning kiln. Hereby is obtained a very reliable heating of all the granules within a very short period of time, the granules partly being heated by the kiln lining, partly being heated by the heat transfer bodies. The kiln lining and the said bodies are heated by the flue gas passing through the kiln. The heat transfer bodies are particular effective because they are arranged close to the kiln lining. At every time such heat transfer bodies which are lowest will be covered by the mass of clay granules. In this way the mass of granules will receive heat as well from outside as from inside. The heating effected by the flue gas as this gas is passing over the mass of granules is of minor importance. What is decisive is that the granules meet as large heating surfaces as possible during the rotation of the kiln.

An embodiment of the rotary kiln according to the invention is characterized in that the heat transfer bodies are formed as rings or ring portions having a diameter which is less than the diameter of the drying kiln. Hereby is obtained a very simple construction.

According to the invention the heat transfer bodies can be formed as rows of tapered trays which are open at the ends, said rows being arranged in rings while the tapered end of each tray merges into the extended portion of the tray in front, and the cavity of each tray is facing the axis of the kiln. Hereby is primarily obtained that the heat transfer bodies will have a particular large surface and secondly that the mass of granules during rotation of the kiln will be moved a short distance upwardly on the kiln lining as the granules — when the trays are in inclined position in the kiln — will be retained a short period of time at the tapered end of the trays. By this measure the time for the heat transfer is extended. Further according to the invention the tapered ends of each tray may have side edge portions which are higher than the other edges of the tray. Hereby is obtained a further extension of the heating surface of the bodies.

Further according to the invention it is also possible that the rows of trays are arranged close to each other. Hereby is obtained that the heating bodies will form a sort of units which relatively easy may be mounted in a kiln.

More over according to the invention the side edge portions of the trays may be perpendicular to the bottom surface of the trays, while the side edge portions and bottom surface is connected with sloping connecting surfaces. This embodiment of the trays has worked particularly well in practice.

Further according to the invention the trays of the rows which are arranged side by side may be riveted or bolted to each other. Hereby is obtained that the trays may be safely secured to each other. According to the invention it is also possible that the rings are singular or double rings which — seen in a vertical and central longitudinal section in the kiln — are displaced in such manner that their lower edges substantially follow a sine curve, and the rings may be mounted on holding means which are extending radially and which are fixed on the wall of the kiln. Hereby is obtained that the bodies primarily will present large heat transferring surfaces and secondly will overturn the mass of granules so that the granules move between each other and so that all granules will come near to hot surfaces.

According to the invention the heat transfer bodies may be formed as bars which are arranged parallel with the generatrix direction of the kiln or arranged so as to form an acute angle herewith. Hereby is obtained that the mass of granules to a certain extent will be moved upwardly on the kiln wall so that a larger heating area is created. Further according to the invention the bars may be arranged in several layers preferably two layers, the bars of the inner layer being arranged so as to register with the space between the bars in the outer layer. The distance between successive bars may be one to five times the diameter of one bar. It is also possible that the form of the heat transfer bodies follows a helical line. Hereby is obtained that the mass of granules very easy may be moved forwardly on the bottom of the kiln so that the granules quickly will reach heated surfaces having a high temperature.

The diameter of the heat transfer bodies may be of the magnitude 20–60 mm. This size is suitable in relation with the common size of the granules.

Further according to the invention the heat transfer bodies may be made of steel whereby is obtained that the bodies will show a very high thermal conductivity and a very high mechanical strength. Preferably so called fireproof steel is used.

According to the invention it is also possible that the cross section of the heat transfer bodies may be rectangular and f.inst. be built of flat bands. Finally according to the invention the heat transfer bodies — seen in the longitudinal direction of the kiln — may extend a length which is 1 to 5 times the diameter of the kiln. Experiments have shown that this length of the bodies will result in a suitable long time of contact for the bodies when the kiln is rotating with a speed of the magnitude 6 turns per minute.

The invention is explained below with reference to the drawings in which

Figure 2:
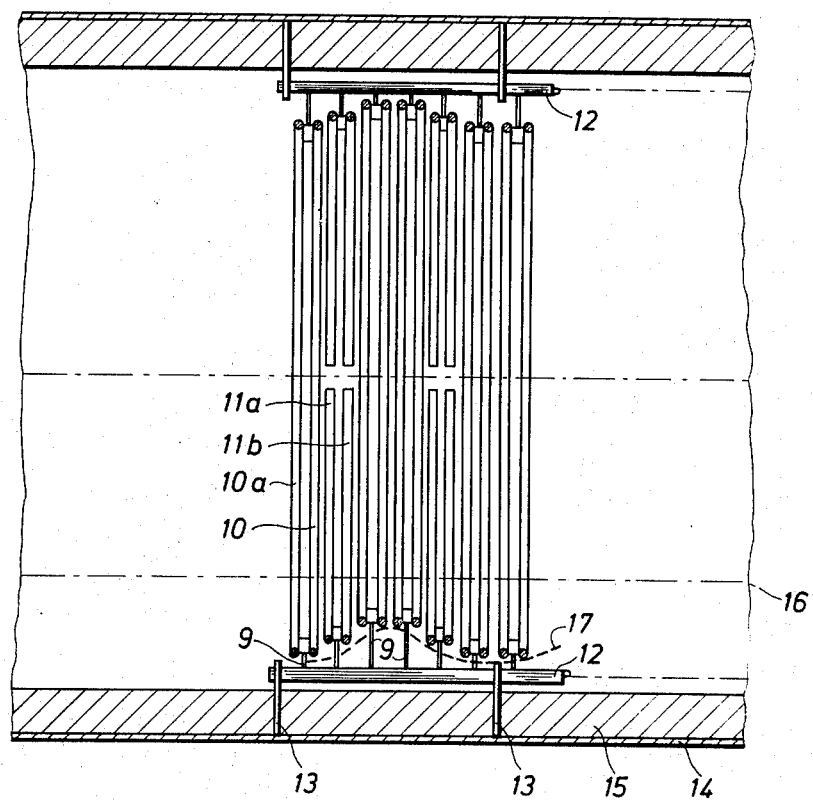
Figure 3:
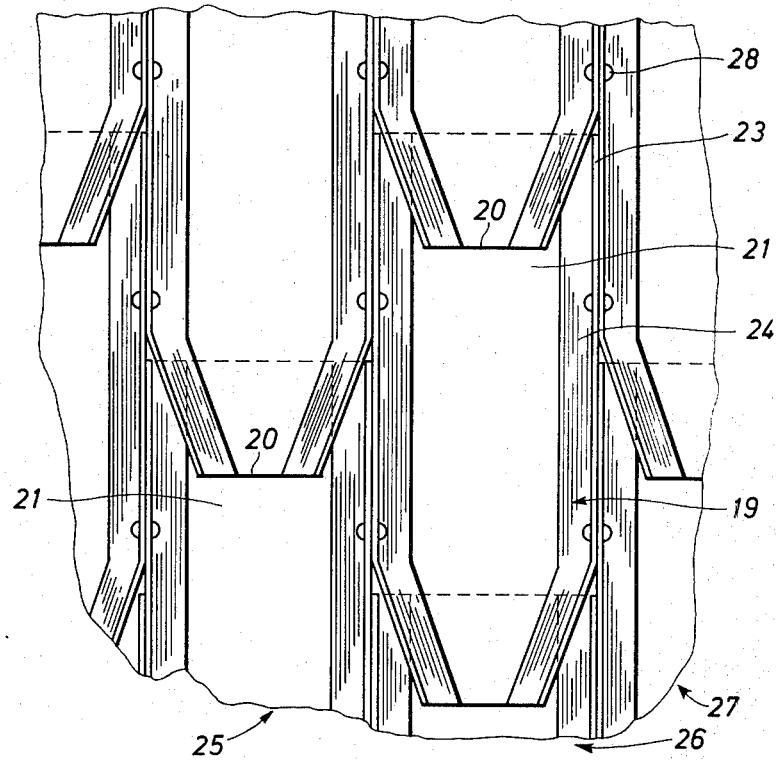
Figure 4:
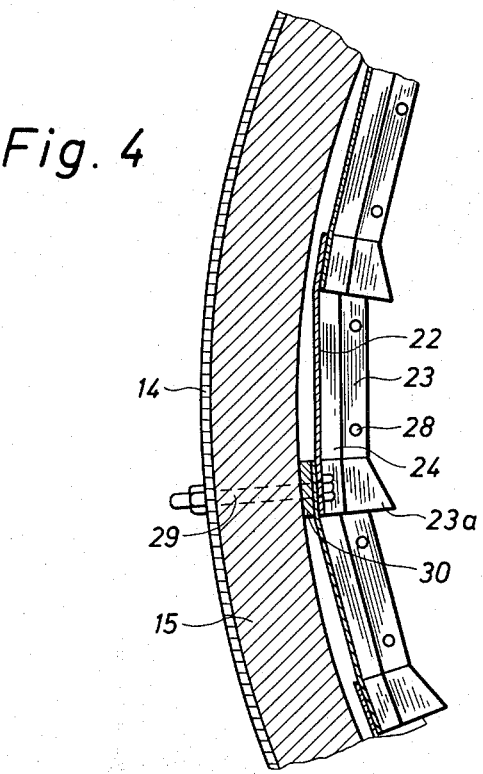
Figure 5:
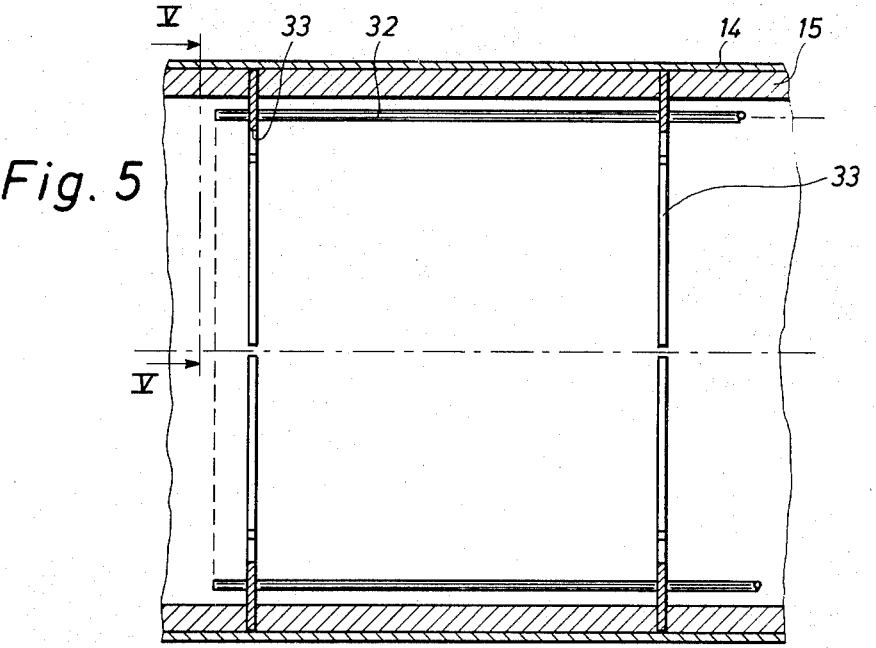
Figure 6:
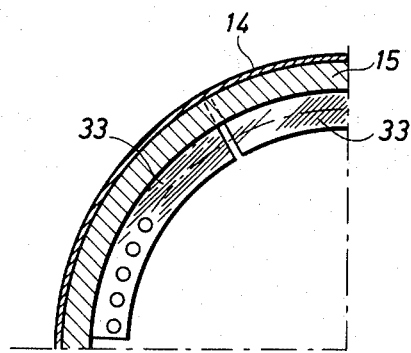
Figure 7:
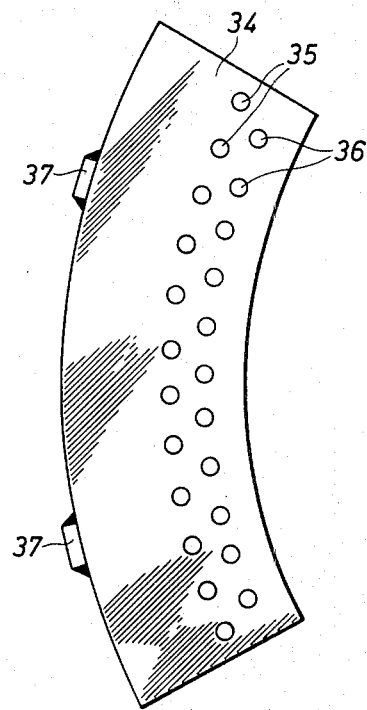
Figure 8:
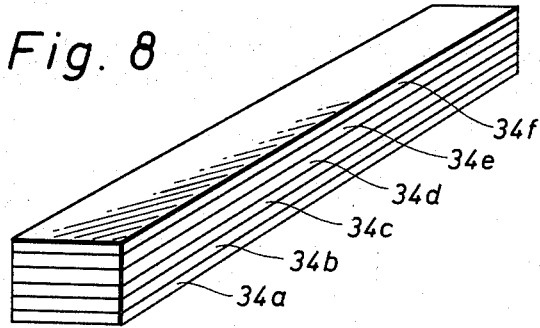

FIG. 1 schematically shows a rotary kiln according to the invention,

FIG. 2 a portion of same seen in longitudinal section and provided with heat transfer bodies in form of rings, FIG. 3 another embodiment of the heat transfer means, this means being formed as trays, this embodiment being seen from the axis of the kiln against the kiln lining, FIG. 4 same seen is a section which is perpendicular to the axis of the kiln, the section being fragmentary, FIG. 5 a longitudinal section in a kiln in which the heat transfer means in form of bars are mounted, FIG. 6 a quarter of a cross section after the line V—V in FIG. 5, said section showing the bars distributed in one layer, FIG. 7 a portion of a mounting ring for holding the bars in two layers, and FIG. 8 a portion of a bar which is built of flat metal bands.

The rotary kiln shown in FIG. 1 comprises a slowly rotating drying kiln 1 and a quickly rotating burning kiln 2. The feeding of the clay product takes place in the right end opening of the kiln. As the clay rolls forwardly through the drying zone it will be divided so as to form granules. The drying is provided by means of a hot flue gas which is fed through the discharge opening 6 of the burning kiln 2 and this flue gas passes to the right in counterflow of the granular clay product. At the distance from the opening 3 to a position 4 close to the left end of the drying kiln 1 the clay product is only heated slowly from approximately 20° C. to approximately 300° C. After having passed the position 4 the granules meet heat transfer bodies which are arranged close to the lining of the kiln. These bodies which will be described in details below may extend a longer or shorter distance. However they do not extend longer than to a position 5 a little to the left of the inlet end 7 of the burning kiln. Between the positions 4 and 5 i.e. in the transition zone marked A in the figures the granules are heated with a speed which is essentially larger than before. Now during approximately 15 – 30 minutes they reach from about 300°–600° C. up to 1,150°–1,175° C. After having passed the position 5 the high temperature is kept for 7 minutes whereafter the temperature is allowed to decrease. The quick heating just described involves that the ability of the granules to bloat will be fully exploited. By this cracks in the granules are avoided and at the same time the bulk density will get rather low so that the capacity of the kiln is increased.

The heat transfer bodies which have a large heat capacity, a large thermal conductivity and a large surface must be arranged near the free surface of the kiln lining because a mass of granules in the bottom of the kiln may then rather easily cover the bodies.

In FIG. 2 the heat transfer bodies are formed as double rings 10a, 10b, 11a, 11b. The rings are arranged on radially extending holding means which by means of bars 12 and holding means 13 are fixed on the wall 14 of the kiln. As it will be noted the rings 10a, 10b, 11a, 11b and the other rings are arranged close to the internal free surface of the kiln lining 15. The mass of granules extends from the lower point of the lining to a level 16. As appears from FIG. 2 the mass of granules will partially receive heat from the outside i.e. from the kiln lining, partially receive heat from inside i.e. from the rings. The lining and the rings are as mentioned above heated by the flue gas passing through the kiln. As the kiln rotates the granules will continuously move forwardly in direction of strongly heated surfaces. The lowest ends of the rings — and also the uppermost ends — may follow a sine curve as indicated by the dotted line 17 in the figure. The heat transfer bodies may also be formed as trays 19 which are arranged in a little distance from the kiln lining following a plane which is substantially perpendicular to the axis of the kiln. The trays 19 are put into each other as shown in the figure but they have a tapered end 20 which merge into an extended portion 21 in the tray in front. Each tray has as shown in FIG. 4 a bottom portion 22 and side portions 23, and these portions are connected by sloping connection surfaces 24. As appears from FIG. 3 the trays are arranged in rows such as the rows 25, 26 and 27 in FIG. 3 and these rows are riveted or bolted together with rivets or bolts 28. For the sake of clearness only one rivet or bolt is provided with reference numeral. It should be noted that the side edge portions 23a at the tapered end 20 of each tray has a height which is larger than the side edge portions at the opposite end. Hereby is obtained that the trays may carry such granules which might deposit in the tapered ends of the trays and carry the said granules to a level above the general level of the granule mass. In other words the granules will be kept in connection with the heat transfer means in an efficient manner. When the kiln has turned such an angle that the trays are nearly vertical the granules will slide down. The rows of trays may be bolted to the kiln wall by means of one or more bolts 29 as indicated in FIG. 4 as a spacing means 30 is inserted between the lining 15 and the rows of trays.

FIG. 5 shows a longitudinal section in a portion of a kiln in which the heat transfer means are formed as bars 32 these bars extending parallel with the generatrix direction of the kiln. The bars are arranged by holding means in form of support rings or support ring portions 33. The bars 32 are placed rather close to each other along the inside surface of the kiln. The distance between them may be 1–5 times the diameter of a single bar. In FIG. 6 the distance between the bars is substantially equal to the diameter of the single bar.

In FIG. 7 another support ring portion is shown. This ring portion together with other similar portions may support two layers of bars. The support ring portion 34 is as the support ring portion 33 provided with holes and these holes are arranged in two rows, an outer row 35, and an inner row 36. The bars are arranged directly in the holes. The support ring portion 34 is — as it is crossing through the kiln lining — fixed on the kiln wall 14 by means of protrusions 37. The diameter of the bars may be 10 – 20 mm. They are preferably made of fireproof steel. In FIGS. 5, 6 and 7 the bars have circular cross section. However, they may have any desirable cross section for inst. rectangular — conf. FIG. 8. In this case the bars are built of flat bands $34b$, $34e$ made of metal having a large thermal conductivity while the outer layers $34a$ and $34f$ are made of a metal showing great mechanical strength. In this way the bar will show great thermal conductivity and great resistance to wear. The sides may also be covered of wear — proof layers.

The bars 32 may form an acute angle with the generatrix direction of a kiln. This arrangement of the bars may f. inst. be provided by a slight clockwise displacement of the holes of the support ring portion 33 in the left ends of FIG. 5 relative to the holes of the support ring portion 33 in the right end of FIG. 5.

The heat transfer bodies may be formed in such manner that they look like an enlarged coil spring. When the kiln rotates each winding of the coil will be disposed to press the granules forwardly.

The above mentioned method and rotary kiln may be changed in many ways without deviating from the inventive idea. The above mentioned embodiments only serve illustrating purposes and do not limit the scope of protection.

I claim:

1. A method of producing an expanded clay product comprising the steps of:
   introducing unexpanded clay at substantially ambient temperature into a drying zone,
   slowly heating of the clay in the drying zone to a temperature of between about 300° to 600° C.,
   passing the clay to a transition zone and heating the clay while in the transition zone to a temperature of between about 1,150° to 1,175° C. within a time period of between 15 and 30 minutes to fully expand the clay, and
   subsequently removing the expanded clay from the transition zone and sending it to the burning zone.

2. A method as claimed in claim 1 characterized in that the heating of the clay product from a temperature in the interval 300°–600° C. to a temperature in the interval 1,150–1,175° C. is made during 20–30 minutes.

3. A rotary kiln for use in producing an expanded clay product comprising a rotary drying portion, a rotary burning portion and a rotary transition portion located intermediate said drying and burning portions, said transition portion being in flow communication with said drying and burning portions, said transition portion comprising a body having an axis of rotation and a generally cylindrically shaped interior surface spaced radially from said axis, a plurality of heat transfer members disposed generally concentrically about said axis in said body and supported to extend closely adjacent said interior surface thereof, said members having a heat capacity and thermal conductivity that is high relative to that of the other portions of said kiln, said members being arranged in close proximity to one another so as to present a large surface area to material being treated in said transition portion.

4. The rotary kiln as claimed in claim 3 wherein said heat transfer members are rings having diameters smaller than that of the interior surface of said body.

5. The rotary kiln as claimed in claim 3 wherein said heat transfer members are a plurality of tapered trays, each tray having an open tapered end, said trays being attached in end to end relation to form annular rings, said rings being positioned along said axis of said interior surface, said tapered end of each of said trays being disposed to merge into an adjacent tray of a said ring.

6. The rotary kiln as claimed in claim 5 wherein each of said trays has side edge portions which extend in the direction of said axis of said body.

7. The rotary kiln as claimed in claim 5 wherein said rings of trays are mounted to be contiguous to one another.

8. The rotary kiln as claimed in claim 6 wherein said trays have bottom surfaces and said side edges of said trays are connected to said bottom surfaces with sloping surfaces.

9. The rotary kiln as claimed in claim 4 wherein said rings are attached to said interior surface by holding means such that the centers of said rings will define a sine curve in a plane passing through a diameter of said interior surface and through said axis of said body.

10. The rotary kiln as claimed in claim 3 wherein said heat transfer members comprise a plurality of bars which are arranged to extend generally parallel to said axis.

11. The rotary kiln as claimed in claim 10 wherein two radially spaced layers of bars are provided, the bars of one layer being arranged so as to register with the spaces between the bars in the other layer.

12. The rotary kiln as claimed in claim 10 wherein the distance between adjacent bars is between one to five times the diameter of one bar.

13. The rotary kiln as claimed in claim 3 wherein said heat transfer members are made of steel.

14. The rotary kiln as claimed in claim 3 wherein said heat transfer members comprise a plurality of flat bands, each band having an outer surface constructed from a wear-resistant material.

* * * * *